United States Patent
Schultz et al.

(10) Patent No.: US 7,593,714 B2
(45) Date of Patent: Sep. 22, 2009

(54) COMMUNICATION SERVICES PAYMENT METHOD AND SYSTEM

(75) Inventors: Charles P. Schultz, North Miami Beach, FL (US); Juan C. Fernandez, Boca Raton, FL (US); Von A. Mock, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 993 days.

(21) Appl. No.: 11/166,597

(22) Filed: Jun. 24, 2005

(65) Prior Publication Data

US 2007/0003034 A1 Jan. 4, 2007

(51) Int. Cl.
*H04M 15/00* (2006.01)
(52) U.S. Cl. .................. 455/407; 455/405; 379/114.05; 379/114.2; 705/44
(58) Field of Classification Search ................. 379/111, 379/114.01, 114.05, 114.17, 114.2, 130, 379/144.01; 455/405, 406, 407, 414.1; 705/26, 705/27, 34, 44
See application file for complete search history.

(56) References Cited

U.S. PATENT DOCUMENTS

| | | | |
|---|---|---|---|
| 7,515,696 B2* | 4/2009 | Engelhart | 379/114.28 |
| 2002/0052754 A1* | 5/2002 | Joyce et al. | 705/1 |
| 2003/0070096 A1* | 4/2003 | Pazi et al. | 713/201 |
| 2003/0232616 A1* | 12/2003 | Gidron et al. | 455/406 |
| 2004/0078331 A1* | 4/2004 | Fakih | 705/40 |
| 2005/0044352 A1* | 2/2005 | Pazi et al. | 713/153 |
| 2006/0068917 A1* | 3/2006 | Snoddy et al. | 463/42 |
| 2008/0090551 A1* | 4/2008 | Gidron et al. | 455/406 |

* cited by examiner

*Primary Examiner*—Binh K Tieu

(57) ABSTRACT

A method (10) of payment of communication services includes determining (14) if a request (12) for services is an essential service or non-essential service, determining (19) if a device and/or user is authorized for non-essential service, and determining (20) if there are sufficient pre-pay funds for the non-essential service. The method can further include rejecting (26) the request for non-essential service if the device and/or user is unauthorized or if insufficient pre-pay funds exist. The method grants (16) the request if the request is for essential service (such as voice services). The essential service or subscription or post-pay service can be added (18) to a recurring bill. If the device and/or user is authorized and sufficient prepay funds exist, then the method grants (22) the request for the non-essential service. In response or in conjunction with granting, the method can deduct (24) funds from prepay funds upon granting the request.

20 Claims, 2 Drawing Sheets

100

COMMUNICATION SERVICES PAYMENT METHOD AND SYSTEM

FIELD OF THE INVENTION

This invention relates generally to payment of communication services, and more particularly to a method and system for payment of essential and non-essential services in a communication system.

BACKGROUND OF THE INVENTION

As family plans and pre-paid communication services (particularly with cellular phone service along with additional services) become increasingly popular, better control in managing budgets and accounts will be needed. Parents may wish to have continuous access to their children or other dependents, which can be accomplished by having subscription-based wireless service. However, parents or those paying the overall bill may wish to limit dependent spending on non-essential services, such as downloading games, music, or other media presentations that are currently available or will be available in the future, particularly with the advances in technology and bandwidth. Today, there is no combination of subscription services and prepay services nor any means of controlling payment of such combination of services. For example, cellular phone service can typically be purchased on a subscription basis or separately with a prepaid plan that can be replenished in several ways. In another context for example, Blockbuster Video provides a prepay game rental card. However, this service is not used in conjunction with any subscription based services.

SUMMARY OF THE INVENTION

Embodiments in accordance with the present invention can provide a method and system for a communication service user such as a wireless device user to create an account which pays for and manages multiple wireless devices or services (on one or more devices). Certain types of services can be designated as non-essential on a group basis and/or on a per-device basis. An account holder's monthly or periodic bill can provide charges for voice and other "essential" services and one or more associated but separately funded pre-paid account(s) can be used for payment of non-essential services on a group or per-device basis. The prepaid portion(s) of the account can be increased by typical means such as activating POS prepay cards, e-coupons, credit or debit card deductions, or cash payment at a service shop or can be increased remotely using over-the-air authorizations.

In a first embodiment of the present invention, a method of payment of communication services include the steps of determining if a request for services is an essential service or a non-essential service, determining if a device and/or user is authorized for non-essential service if the request is for a non-essential service, and determining if there is sufficient pre-pay funds for the non-essential service if the device or user is authorized. The method can further include the step of rejecting the request for the non-essential service if the device and/or user is not authorized or if there is insufficient pre-pay funds. The essential service can be a subscription or post-pay service and the method can grant the request if the request is for the essential service (such as voice services). The essential service or subscription-based or post-pay service can be added to a recurring bill such as a monthly or other periodic bill. If the device and/or user is authorized and if there is sufficient prepay funds, then the method can grant the request for the non-essential service (such as gaming or music downloads). In response or in conjunction with granting the request for non-essential services, the method can deduct funds from prepay funds upon granting the request. The device or a user of the device can be "grounded" or "suspended" and prevented from obtaining a grant for non-essential services in a number of ways including using a web interface or a push to suspend function on a wireless device that a parent or other payer can access. Likewise, the device or user can be rewarded with an addition to their pre-paid funds. Additionally, the method can further include the step of establishing a maximum amount of funds that can be transferred using prepaid funds over a predetermined period of time.

In a second embodiment of the present invention, a wireless device can include a transceiver and at least one processor in communication with the transceiver. The processor can be programmed to determine if a request for services is an essential service or a non-essential service and further determine if a device and/or user is authorized for non-essential service if the request is for a non-essential service. The method can further determine if there is sufficient pre-pay funds for the non-essential service if authorized for non-essential services and reject the request for the non-essential service if the device and/or user is not authorized or if there is insufficient pre-pay funds. The processor can be further programmed to grant the request for the non-essential service if the device and/or user is authorized and if there is sufficient prepay funds, whereupon the device is further programmed to deduct funds from the prepay funds.

Other embodiments, when configured in accordance with the inventive arrangements disclosed herein, can include a system for performing and a machine readable storage for causing a machine to perform the various processes and methods disclosed herein.

DETAILED DESCRIPTION OF THE DRAWINGS

Figure 1:
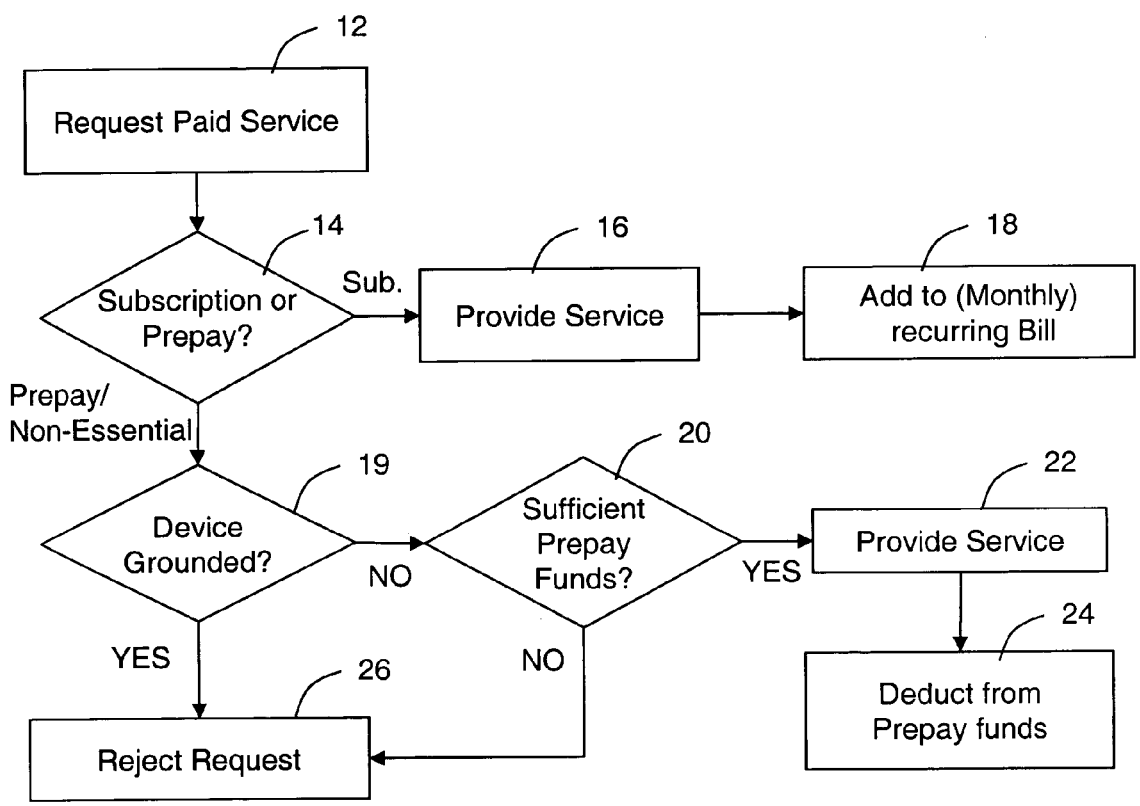
FIG. 1 is a flow chart illustrating a method of paying for communication services for essential and non-essential services in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a method 10 of monitoring and controlling payment of communication services such as wireless services (although the embodiments are not necessarily limited thereto) is facilitated with an account which can pay for and manage multiple wireless devices or services using one or more wireless devices. Certain types of services can be designated as nonessential on a group basis and/or on a per-device basis. The account holder's monthly (or otherwise recurring) bill provides charges for voice and other "essential" services and an associated but separately funded prepaid account can be used for payment of non-essential services (such as gaming or music downloading) on a group or per-device basis. Note, the communication services do not necessarily need to be limited to wireless communication services and the list of essential and non-essential services do not necessarily need to be limited, but can be defined by the payer of the services. Although examples with voice services on a cellular phone as essential and gaming and music downloads as non-essential are used, any number of existing and future services (such as TV services, interactive gaming services, video conferencing, etc.) can be designated accordingly as needed.

The method 10 can begin with a request for services by a device at step 12. At decision block 14, a determination is made whether the requested service is an essential (or subscription service) or a non-essential (or pre-paid) service. If the service requested is subscription-based or essential, then the service is provided at step 16 and the service is added to a recurring bill such as a monthly bill at step 18. If the service requested at decision block 14 is non-essential or prepaid, then a further determination is made as to whether the device (or user) is not authorized or "grounded" or "suspended" at decision block 19. If the device or user is not authorized or grounded or suspended, the request for non-essential or pre-paid services is rejected at step 26. If the device or user is authorized to request non-essential services (or not suspended) at decision block 19, then a further inquiry is made whether there is sufficient prepaid funds for the non-essential or prepaid services at decision block 20. If there are insufficient funds, then the request for non-essential or prepaid services is rejected at step 26. If there are sufficient funds at decision block 20, then the non-essential or prepaid service(s) is (are) provided at step 22 and a corresponding deduction from prepay funds are made at step 24. What is essential service or non-essential service can be defined by the end user or the carrier or any other suitable entity.

Note, a parent, account administrator or payer can "ground" or "suspend" or punish or restrain or prevent a user from using any prepaid funds for a target device for a specified period of time. This can be done by any number of ways such as accessing a web page or by using a "Push-To-Suspend" capability, which transmits a "suspend" op code. The "suspend" op code can identify which device and/or group to suspend prepaid service for (selected from a list or entered manually), and the duration of the suspension (from a list or manually). Note, the "suspend" op code can identify a specific device, a specific group, or both a specific group and device.

Similarly, a parent can reward a user by adding prepaid funds for a target device (or a target user on the target device). The additional prepaid amount can be subsequently added to the bill for either the recipient's or a donor's subscription service, and could include an additional amount for a service or transaction fee. The transfer can also be done by as similar described above accessing a web page or by using a "Push-To-Reward" function or capability, which transmits a "reward" op code. The "reward" op code can identify which device or group to add prepaid funds to (selected from a list or entered manually), and the amount to be added (from a list or manually). Additionally, the account could establish a maximum amount of funds that could be transferred to prepay over a designated period of time, in order to limit fraud or abuse. The prepaid portion(s) of the account can also be increased by activating point-of-sale (POS) prepay cards, e-coupons, or cash payment at a service shop. Cards can be purchased based on dollar amounts or represent specific items to purchase such as a wireless game. Such cards or e-coupon codes can be bundled with the purchase of console or PC versions of the game. Thus, a reward in the context herein can range from a coupon obtained by the user to a transfer or authorization from another person's account such as a parent's account. In this manner new funds can be granted to a user's pre-pay account either by themselves or by a "sponsor" and such funds can be designated to specific services or service groups.

Figure 2:
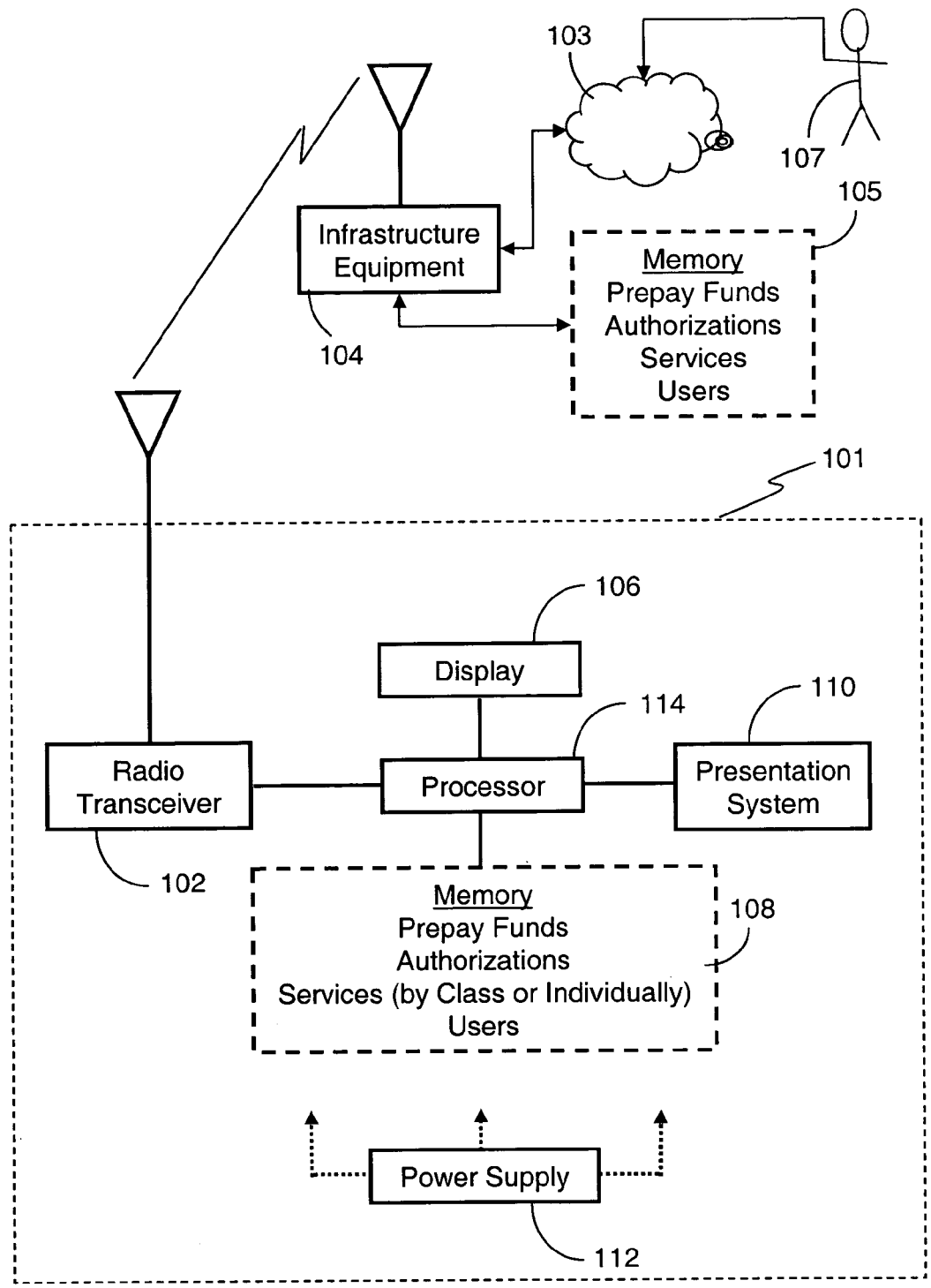
FIG. 2 is a block diagram of a device such as a selective call receiver in accordance with an embodiment of the present invention.

Referring to FIG. 2, a block diagram of a communication system 100 including a selective call radio (SCR) 101 and/or infrastructure equipment 104 in accordance with an embodiment of the present invention is shown. A processor in either the SCR or the infrastructure equipment or both can perform the method 10 described above. The SCR 101 can include conventional components including a radio transceiver 102 for exchanging messages with a communication system (e.g., a cellular network) using the infrastructure equipment 104, a display 106 for conveying images to a user of the SCR 101, a memory 108 including one or more storage elements (e.g., Static Random Access Memory, Dynamic RAM, Read Only Memory, etc.), a presentation system 110 for conveying audible signals and/or visual signals (e.g., voice messages, music, video etc.) to the user of the SCR 101, a conventional power supply 112 for powering the components of the SCR 101, and a processor 114 comprising one or more conventional microprocessors and/or digital signal processors (DSPs) for controlling operations of the foregoing components. The memory 108 can work in conjunction with the processor 114 to manage and keep track of prepay funds, authorizations, particular services and users as described in the method 10 above. Alternatively, a memory 105 coupled to the infrastructure equipment 104 can be used to manage and track prepay funds, authorizations, services and users. In yet another alternative, financial information can be kept at both the infrastructure equipment 104 and at the SCR 101 in order to reduce the opportunity for fraud in a system where both numbers must match in order to perform or accept a transaction.

Prepaid service requests, such as downloading a game or music, are only granted when the device is not "grounded" (suspended) and there are sufficient funds to complete the transaction. The SCR 101 or infrastructure equipment 104 can maintain all or a portion of the records for each device's prepaid account, group affiliation of each device, non-essential services associated with each device and/or group, suspended or active status of each device, and prepaid funds available for each device. An authorized user 107 such as a parent can directly alter or modify the amount or access to pre-pay funds available at the SCR 101 or the authorized user can remotely access and alter such access or amount of prepay funds using a network 103 linked to SCR 101 or to the infrastructure equipment.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of payment of communication services, comprising the steps of:
   determining if a request for services is an essential service or a non-essential service;
   if the request is for a non-essential service, determining if a device and/or user is authorized for non-essential service;
   if authorized, determining if there is sufficient pre-pay funds for the non-essential service; and
   rejecting the request for the non-essential service if the device or user is not authorized or if there are insufficient pre-pay funds.

2. The method of claim 1, wherein the essential service is a subscription or post-pay service and the method further comprises the step of granting the request if the request is for the essential service.

3. The method of claim 2, wherein the method further comprises the step of adding the subscription or post pay service to a periodic bill.

4. The method of claim 1, wherein the method further comprises the step of granting the request for the non-essential service if the device or user is authorized and if there are sufficient prepay funds.

5. The method of claim 4, wherein the method further comprises the step of deducting funds from the prepay funds upon granting the request for the non-essential service.

6. The method of claim 1, wherein the method further comprises the step of suspending one or more non-essential services by using at least one among a web interface or a push to suspend function on a wireless device.

7. The method of claim 1, wherein the method further comprises the step of rewarding the device with prepaid funds.

8. The method of claim 1, wherein the method further comprises the step of establishing a maximum amount of funds that can be transferred using prepaid funds over a predetermined period of time.

9. A wireless device, comprising:
   a transceiver; and
   at least one processor in communication with the transceiver, wherein the processor is programmed to:
   determine if a request for services is an essential service or a non-essential service;
   if the request is for a non-essential service, determine if a device or user is authorized for non-essential service;
   if authorized, determine if there are sufficient pre-pay funds for the non-essential service; and
   reject the request for the non-essential service if the device or user is not authorized or if there are insufficient pre-pay funds.

10. The device of claim 9, wherein the essential service is a subscription or post-pay service and the processor is further programmed to grant the request if the request is for the essential service.

11. The device of claim 10, wherein the processor is further programmed to add the subscription or post-pay service to a periodic bill.

12. The device of claim 9, wherein the processor is further programmed to grant the request for the non-essential service if the device or user is authorized and if there are sufficient prepay funds.

13. The device of claim 12, wherein the device is further programmed to deduct funds from the prepay funds upon granting the request for the non-essential service.

14. The device of claim 9, wherein the processor is further programmed to suspend one or more non-essential services by using at least one among a web interface or a push to suspend function on the wireless device.

15. The device of claim 9, wherein the device is further programmed to reward the device with prepaid funds.

16. The device of claim 9, wherein the device is further programmed to enable the establishment of a maximum amount of funds that can be transferred using prepaid funds over a predetermined period of time.

17. A machine-readable storage, having stored thereon a computer program having a plurality of code sections executable by a machine for causing the machine to perform the steps of:
   determine if a request for services is an essential service or a non-essential service;
   if the request is for a non-essential service, determine if a device or user is authorized for non-essential service;
   if authorized, determine if there are sufficient pre-pay funds for the non-essential service;
   reject the request for the non-essential service if the device or user is not authorized or if there are insufficient pre-pay funds.

18. The machine-readable storage of claim 17, wherein the machine-readable storage is further programmed to grant the request for the non-essential service if the device or user is authorized and if there are sufficient prepay funds.

19. The machine-readable storage of claim 18, wherein the machine-readable storage is further programmed to deduct funds from the prepay funds upon granting the request for the non-essential service.

20. The machine-readable storage of claim 17, wherein the machine-readable storage is further programmed to suspend one or more non-essential services by using at least one among a web interface or a push to suspend function on the wireless device.

* * * * *